INVENTOR.
ALBERT W. TONDREAU
BY
W E Beatty
ATTORNEY.

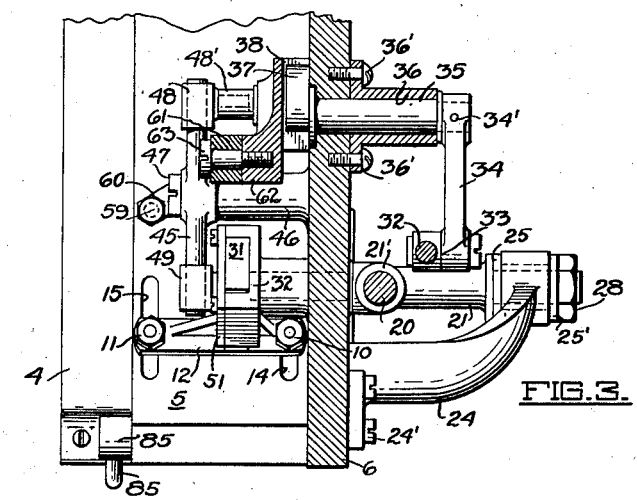
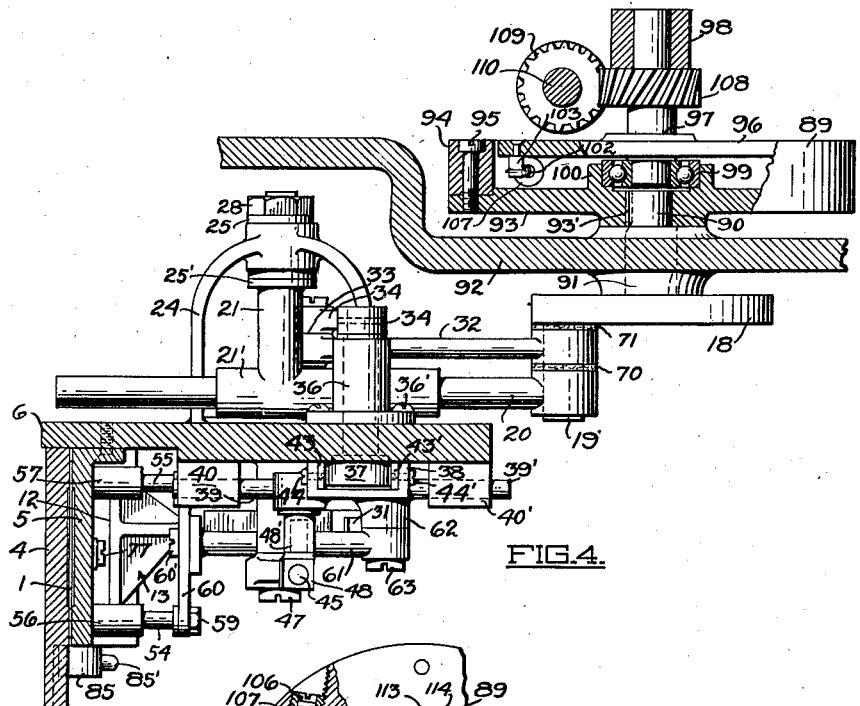
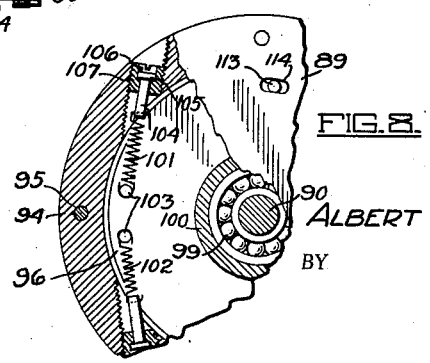

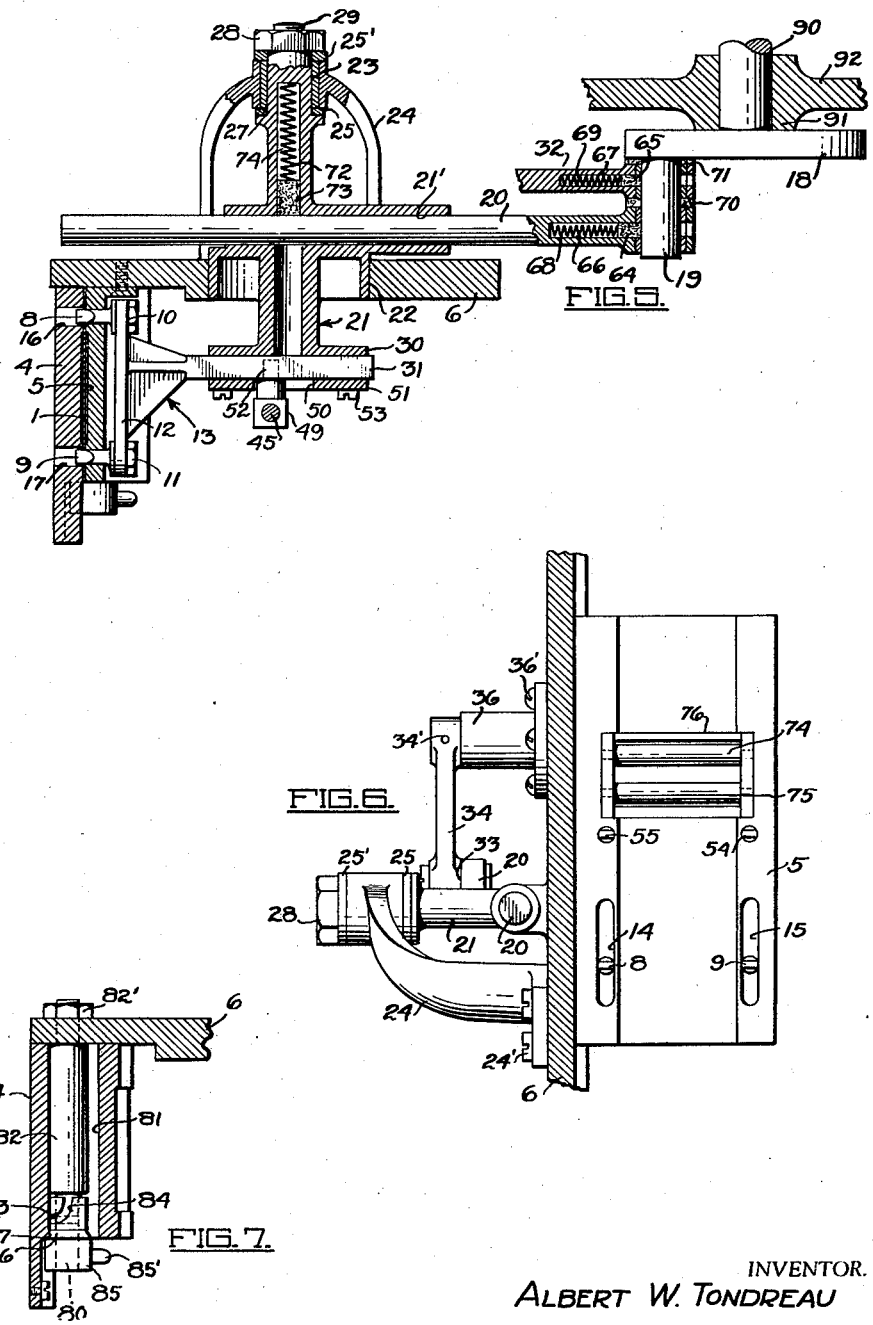

July 19, 1938.  A. W. TONDREAU  2,124,322
FILM PULL-DOWN MECHANISM
Filed Nov. 22, 1935   5 Sheets-Sheet 4

INVENTOR.
ALBERT W. TONDREAU
BY
ATTORNEY

July 19, 1938.  A. W. TONDREAU  2,124,322

FILM PULL-DOWN MECHANISM

Filed Nov. 22, 1935  5 Sheets-Sheet 5

INVENTOR.
ALBERT W. TONDREAU
BY  W. L. Beatty
ATTORNEY

Patented July 19, 1938

2,124,322

UNITED STATES PATENT OFFICE 2,124,322

FILM PULL-DOWN MECHANISM

Albert W. Tondreau, Glendale, Calif., assignor to Warner Bros. Pictures, Inc., New York, N. Y., a corporation of Delaware Application November 22, 1935, Serial No. 51,177

13 Claims. (Cl. 88—18.4)

This invention relates to intermittent movement mechanisms, and particularly to intermittent film movements for moving a motion picture film in a step by step motion past the picture gate of a motion picture camera.

The movement comprising the present invention is of the general type in which a pair of claws operate intermittently to engage and pull down the film before the photographing aperture. A pair of pilot or register pins, interconnected with the claws, operate to engage and hold the film in a steady position during the return stroke of the claws. It is of extreme importance that the film, while it is being exposed, be held perfectly motionless to prevent blurring of the image. Pilot or registering pins have been used for some time to attain this result by engaging the perforations of the film and holding the film from movement while it is being exposed. Although these pins prevent longitudinal movement of the film, all prior arrangements of which I am aware, and which include rotating cams or eccentrics to operate the pilot pins, produce a small lengthwise movement of the pins transversely of the film while in engagement with the film; that is, while the film is being exposed. In movements employing eccentrics for operating the pilot pins, this "in and out" movement of the pins is practically continuous while in movements employing rotating cams for this purpose, the pilot pins may remain stationary for a portion of the time which is usually about one-half of the total exposure time. During the remaining portion of the exposure time, however, the pins are being moved longitudinally. Due to the fact that the pilot pins must be a very snug fit in the perforations of the film, in order to hold the film perfectly motionless longitudinally thereof during the exposure time, there is generally considerable friction between the pins and the film. Especially is this true where the film has shrunk or otherwise been distorted in form or where the intermittent movement has expanded due to heating. It will therefore be seen that the sawing action of the pilot pins in and out, while engaging the film, tends to move the film back and forth along with the pins, thus causing a fluttering action, it being understood that a necessary amount of clearance has to be allowed between the film and the guide surfaces to prevent friction therebetween. Although spring pressed arrangements, such as pressure pads, etc., have been used to hold the film against one of its guiding surfaces, the friction between the film and the perforations may be so great that the film will be pushed forward and backward against the action of such spring devices. Furthermore, this sawing action of either the pilot pins or the pull-down claws causes considerable wear in both the film perforations and the member itself as well as tending to produce vibration and noise.

One object of the present invention is to minimize the sawing action of the claws and/or pilot pins while in engagement with the film perforations.

This is accomplished by providing a rocking cam to produce an in and out movement of the claws and/or pilot pins. The cam is interconnected with the driving mechanism of the pull down mechanism and is so constructed that a cam follower operating the film engageable member, i. e. claws and/or pilot pins, engages an inactive portion of the cam while the member is in engagement with the film perforations.

Other features of the invention are the provision of a mechanism which is simple in construction, capable of high speed, reversible in direction, and that has a fast "pull down" and a long period of "dwell."

The above object and features of the invention will be more clearly understood from the following detailed description, reference being had to the accompanying drawings in which:

Fig. 3 is a sectional elevation view taken along the line 3—3 of Fig. 1.

Fig. 4 is a sectional plan view taken along the line 4—4 of Fig. 1.

Fig. 5 is a sectional view through the shuttle fork and is taken along the line 5—5 of Fig. 1.

Fig. 6 is a sectional elevation view of the rear guide plate taken along line 6—6 of Fig. 2.

Fig. 7 is a plan sectional view of the locking means for holding the aperture plate in closed or threading position and is taken along the line 7—7 of Fig. 2.

Fig. 8 is a transverse section partly broken off of the flexible flywheel.

Figure 1:
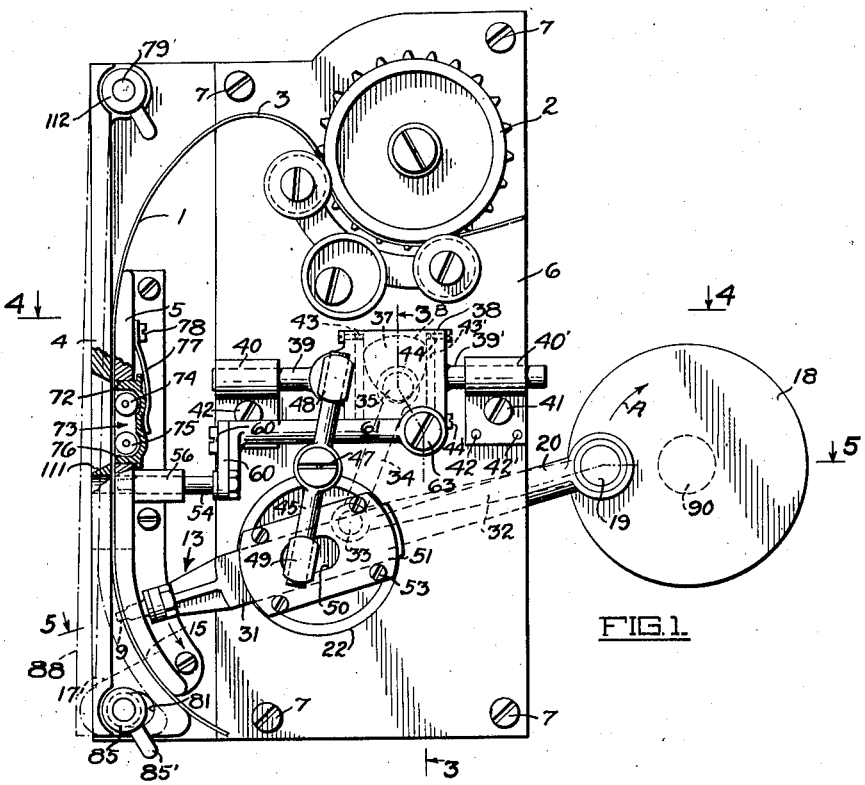
Fig. 1 is a side elevational view of the pull down mechanism embodying my invention in which the parts are shown as being in position where the film moving claws are in about the middle of their film movement.

More particularly describing the invention as herein illustrated, reference is had to Fig. 1 wherein the film 1 is drawn by a feed sprocket 2 and passed into a free loop 3 from whence it passes between an aperture plate 4 and a rear guide plate 5 comprising the film guiding means. Both the aperture plate 4 and the guide plate 5 are mounted upon a rear wall 6 at right angles thereto. The rear wall 6 which supports the pull down mechanism proper is adapted to be mounted in any suitable manner, such as by screws 7, within the casing of a motion picture camera (not shown) and thus operate in conjunction with a suitable shutter mechanism and with a suitable arrangement of lenses as is apparent to one familiar with the art. The film engaging claws 8 and 9 (Fig. 5) have their ends formed so as to engage the sprocket hole perforations provided along either side of the film 1 and are attached by means of nuts 10 and 11 to the cross head 12 of a film advancing member or shuttle fork 13. The claws 8 and 9 operate within elongated slots 14 and 15 (Fig. 6) provided in the rear guide plate 5 and also extend a short distance into similar and registering slots 16 and 17 (Figs. 1 and 5) provided in the aperture plate 4.

The claw or shuttle fork actuating mechanism is divided into two parts, one for effecting the up and down motion of the claws 8 and 9 and the other for effecting the in and out motion of the same claws at the limits of their up and down motion. Both of these movements are actuated by an eccentric disk 18 having a crank pin 19 mounted thereon.

A connecting rod 20 having one end journaled on the crank pin 19 is slidable within an elongated bearing portion 21' provided on a rocking bearing member 21 as clearly shown in Fig. 5. The member 21 has an enlarged bearing portion 22 which is journaled within the wall 6. The outer end of the member 21 is journaled within a bushing 23 secured within a bracket 24 which is in turn, secured by screws 24' (Fig. 6) to the wall 6. A pair of washers 25 and 25' on either end of the bushing 23 engage a shoulder 27 on the member 21 and a nut 28 respectively, the nut 28 being mounted upon a threaded end portion 29 of the member 21 to prevent axial movement of the member. The forward end of the member 21 is provided with an elongated bearing portion 30 to slidably receive a rectangular shank 31 of the shuttle fork 13. Thus it will be seen that the rotation of the eccentric 18 causes the connecting rod 20 to produce a rocking motion of the bearing member 21 and in turn will cause the claws 8 and 9 of the shuttle fork 13 to be moved through an arc concentric with the bearing member 21. It is this motion of the claws which pulls the film downward past the picture aperture 111 provided in the aperture plate 4 (Fig. 1).

Describing now the means for moving the claws 8 and 9 in and out of engagement with the film, a second connecting rod 32 (Figs. 3 and 4) is also journaled at one end upon the crank pin 19. The other end of the connecting rod 32 is pivotally mounted as at 33 (Figs. 1 and 3) to a crank arm 34 which is secured by a pin 34' to a rocking shaft 35. The shaft 35 is journaled within a bearing member 36 secured to the rear of the wall 6 by means of screws 36'. The inner end of the shaft 35 is provided with a rocking cam 37. The cam 37 engages a cam follower 38 having circular supporting studs 39 and 39' (Fig. 1) projecting on either side thereof which are slidably carried within bearings 40 and 40'. Bearings 40 and 40' are secured to the front of the wall 6 by means of screws 41 and held in alignment by means of dowel pins 42 and 42'. Renewable shims or shoes 43 and 43' (Fig. 4) are provided on the front and back inner edges of the cam follower and are held therein by screws 44 and 44'. A link member 45 (Figs. 1 and 3) is pivoted intermediate its ends upon a boss 46 projecting from the front edge of the wall 6 by means of a screw 47. The upper end of the link 45 is slidably carried within a rocking bearing 48 mounted on a boss 48' on the forward edge of the cam follower 38. The lower end of the link 45 is slidably carried within a rocking bearing 49 which projects through an elongated opening 50 in a cover plate 51 provided at the forward edge of the bearing 32 and is secured to the shank 31 of the shuttle fork 13 as shown at 52 (Fig. 5). Cover plate 51 is secured to the forward end of the bearing 32 by means of screws such as 53 (Figs. 4 and 6).

Register pins 54 and 55 are provided above the claws 8 and 9 and are adapted to slide within bearings 56 and 57 formed integrally with the rear guide wall 5. The ends of the pins 54 and 55 are of the same shape and size as the ends of the claws 8 and 9 and are adapted to engage and hold the film in position before the film aperture 111 (Fig. 1) of the aperture plate 4 while the claws 8 and 9 are returning on their upward stroke. Pins 54 and 55 are secured at their rear ends by means of nuts 59 to a cross head 60 which, in turn, is secured by a screw 60' to the forward end of a link member 61. The member 61 is secured at its rear end to a boss 62 (Fig. 4) provided on the cam follower 38 by means of a screw 63. Thus it will be seen that forward motion of the cam follower 38 will effect a similar motion to the register pins 54 and 55 and at the same moment will effect a rearward motion through the link 45 to the claws 8 and 9 and vice versa.

Referring now to Fig. 5, the crank pin 19 of the eccentric disk 18 is lubricated by means of lubricant impregnated wicks 64 and 65 provided in longitudinally extending apertures 66 and 67 provided within the ends of the connecting rods 20 and 32. Springs 68 and 69 force the wicks 64 and 65 into engagement with crank pin 19. Fibrous washers 70 and 71 also assist in lubricating the crank pin 19. The rocking bearing member 21 is similarly provided with a longitudinal aperture 72 to receive a lubricant impregnated wick 73 and its associated springs 74 to lubricate the connecting rod 20.

Figure 2:
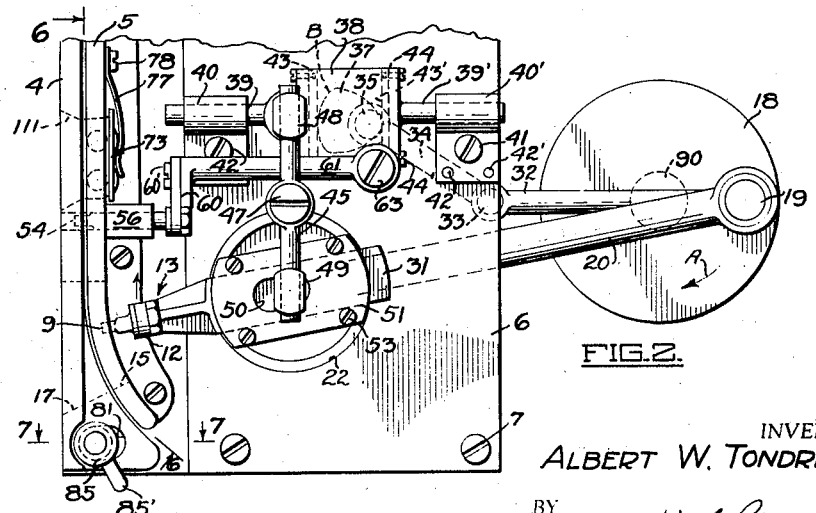
Fig. 2 is a view similar to that of Fig. 1, partly broken off, showing the film moving claws in about the middle of their return movement.
Figure 9:
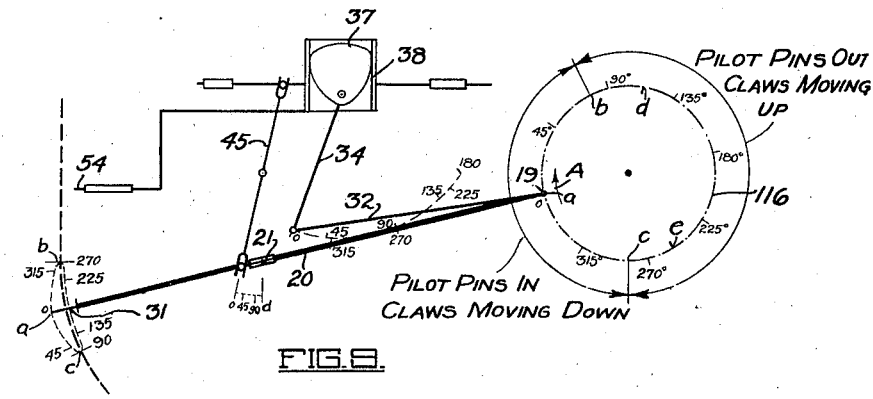
Figs. 9–11 are diagrammatic views showing the pull down mechanism in various positions.

As was stated before, one object of the invention is to obtain a fast "pull down" and a comparatively long "dwell" of the film. This is accomplished by rotation of the eccentric disk 18 in a clockwise direction as indicated by the arrow A (Figs. 1, 2, and 9). When the claws 8 and 9 are moving the film downward as in Figs. 1 and 9, the length of the lever arm between the crank pin 19 and the center of the bearing member 21 is relatively shorter in comparison to the lever arm between the member 21 and the ends of the claws 8 and 9 than when the claws are moving in their upward return motion as in Fig. 2, thus insuring a faster downward movement and a comparatively slow return. In the operation of the device, reference is to be had to Figs. 9, 10, and 11. The circle 116 is the circle of eccentricity of the eccentric pin 19. While the pin 19 moves from points c to b in the direction of arrow A the claw member 31 will be moving downward in its film moving stroke whereas from b to c the member 31 will be moving upwardly in a disengaged return stroke. It will be seen, therefore, that due to the longer arc of travel of the pin 19 on the return stroke, the film will be given a longer period of dwell before the photographic aperture. When the pin 19 has reached the point d on circle 116, the registering pins 54 have fully engaged the film and the claw member 31 is starting on its upward stroke. From point d to c (Figs. 10 and 11) the cam follower 38 will be engaged by the concentric, inactive portion 37'a of the cam 37, thus preventing a sawing motion of the registering pins 54 relative to the film during the major portion of the exposure.

Referring now to Figs. 1 and 6, it will be noted that the rear film guide wall 5 is apertured at 22 opposite the picture aperture 111 to receive a pressure roller assembly 73 slidably therein. Assembly 73 comprises a pair of rollers 74 and 75 rotatably mounted within a cage 76 which is resiliently pressed against the film 1 passing through the aperture plate 4 by means of a spring 77 secured to the rear of the guide wall 5 by means of a screw 78.

The aperture plate 4 is pivotally mounted at its upper end to the wall 6 by means of a stud 79. Referring now to Figs. 1 and 7, it will be noted that the lower end of the aperture plate 4 is provided with an elongated slot 81 through which projects a stud 82 secured to the rear wall 6 by means of a nut 82'. The forward reduced end portion 80 of the stud 82 has a pin 83 projecting transversely through it which is adapted to be engaged within a bayonet slot indicated at 84 provided on a sleeve member 85. A handle 85' on the member 84 allows for rotation so as to lock a conical shoulder 86 upon a similar shaped seat 87 of the aperture plate 4. By releasing the sleeve member 84, the aperture plate may be swung forward into the position shown by the dotted lines 88 in Fig. 1 to thus allow for threading or removal of the film within the picture gate and also to allow for cleaning the film passages. A sleeve member 112, similar to that of 85, is provided on the upper stud 79 to retain the aperture plate thereon.

Figure 10:
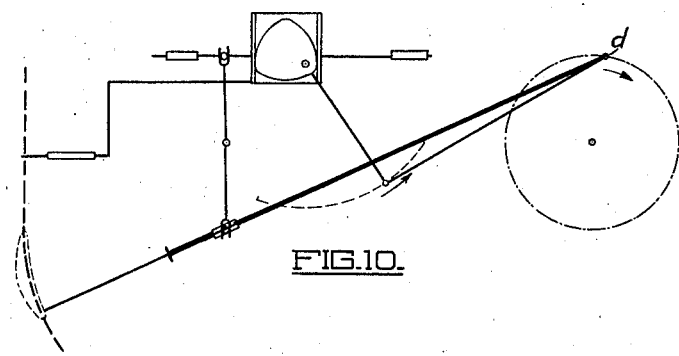
Figure 11:
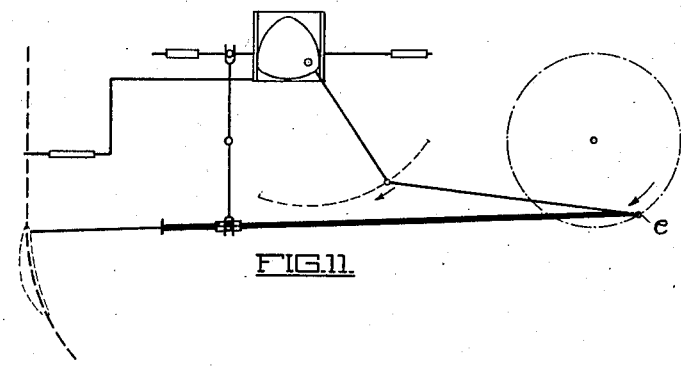
Figure 12:
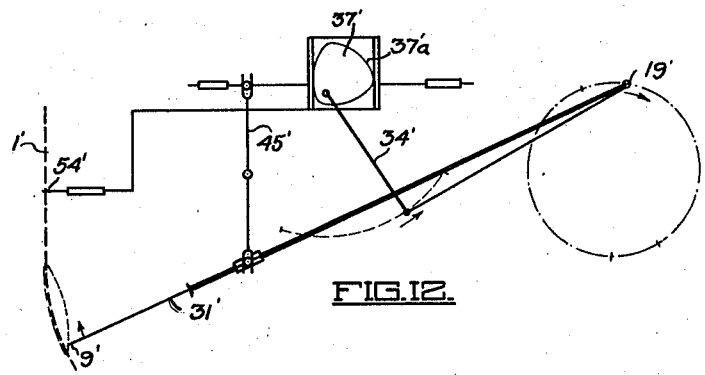
Fig. 12 is a diagrammatic view of a modified form of the invention.

Fig. 12 is a diagrammatic view of a modified form which is similar to that shown in Figs. 9 to 11 except that the cam 37' is adjusted to a different angular position in relation to the arm 34' in which case the inactive portion 37'a is in contact with the cam follower 38' during the downward film advancing stroke of the pull down claw member 31. In this particular form sawing action between the film claws and the film perforations is prevented during the film advancing stroke.

Figure 13:
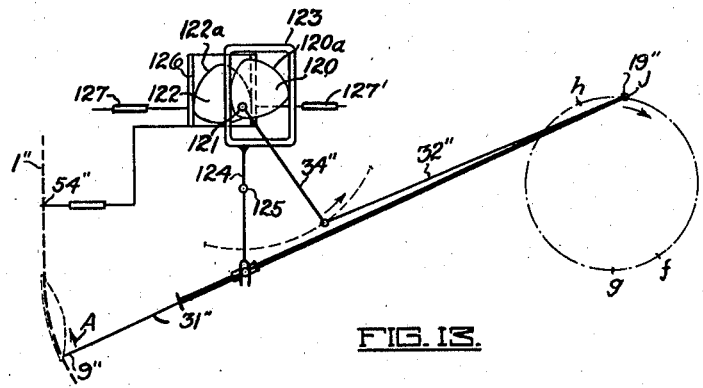
Figs. 13 and 14 are diagrammatic views of a further modification showing the pull down mechanism in different positions.
Figure 14:
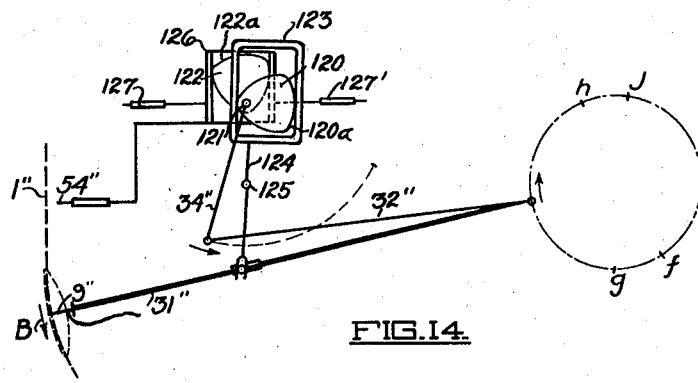

Figs. 13 and 14 are diagrammatic views of a further modified form of pull down mechanism in which sawing action is prevented on engagement of the film by both the pull down claws and the pilot pins. In this arrangement a cam 120 is actuated by an arm 34'' through a connecting rod 32'' by an eccentric 19'' in a manner similar to that shown in Figs. 9 to 12. Cam 120 pivots about a point 121 and has a second cam 122 rotatably secured in any suitable manner thereto to also rotate about the point 121. Cam 120 engages a rectangular cam follower 123 rigidly provided upon the upper end of a link member 124. Member 124 is pivotally mounted at 125 upon a stationary support (not shown) and engages at its lower end the claw member 31'' to impart a longitudinal film engaging and disengaging motion thereto. The cam 120 is so angularly adjusted that during the downward film advancing stroke of the claw member 31'' the inactive portion 120a of cam 120 engages the sides of cam follower 12B and thus prevents in and out motion of the film claws. Cam 122 engages a cam follower 126 which is slidable horizontally within bearings 127 and 127' and is rigidly connected to the pilot pins 54''. The cam 122 is also so angularly adjusted that during the film engaging stroke of the pilot pins the inactive portion 122a of cam 122 will be in engagement with cam follower 126 thus preventing movement during that portion of the cycle. Fig. 13 shows the claw member 31'' at the beginning of its return stroke, traveling in the direction of the arrow A. At this point the pilot pins 54'' have fully engaged the film 1'' and will remain in this position until the eccentric 19'' reaches the point f after which the pins 54'' will begin to disengage. At this time the pull down claws 9'' will begin to enter the film perforations. By the time the eccentric has traveled from point f to g the pilot pins 54'' will be completely disengaged and the pull down claws completely engaged and ready to advance the film downward. Fig. 14 shows the claw member 31'' half way through its film advancing stroke and traveling in the direction of arrow B. The pilot pins 54'' are now at their fully retracted position. When eccentric 19'' reaches point h the pull down claws 9'' are at the end of their stroke, ready to be disengaged while the pilot pins 54'' are about ready to engage the perforations. During the travel of eccentric 19'' from h to j the pilot pins 54'' engage the film perforations and the claws 9'' are disengaged.

Referring now to Figs. 4 and 8, it will be noted that the eccentric disk 18 of the pull down mechanism is driven through a flexible flywheel generally indicated at 89. A spindle 90 carrying the eccentric disk 18 at one end and the flywheel 89 at the opposite end is journaled within a bearing 91 provided in the wall 92 forming part of the camera casing. The flywheel 89 comprises a disk 93 secured to the spindle 90 by a key 93' and has a relatively heavy rim 94 secured thereto by means of bolts 95. A second disk 96 is provided adjacent the rim 94 and is secured to a second shaft 97 coaxial with the spindle 90. The shaft 97 is journaled at one end within bearing 98 and at the other end within a ball bearing 99 secured within a hub 100 provided at the inner end of the flywheel disk 93. Connection between the flywheel 89 and the disk 96 is secured by means of springs as at 101 and 102 as shown in Fig. 8. These springs are secured at one end to pins 103 projecting from the disk 96 and at their other ends to pins 104 having heads 105 which are mounted within counter-bored holes 106 of threaded screws 107. The screws 107 are threadably mounted within the rim 94 of the flywheel 89. A spiral gear 108 secured upon the shaft 97 meshes with another spiral gear 109 mounted on a motor drive shaft 110.

In balancing the flywheel and the accompanying pull down mechanism, a mark is placed on the outer edge of the rim 94 of the flywheel 89 and while rotating the flywheel, is viewed through a stroboscope (not shown). The tension of the springs 101 and 102 is then adjusted by means of the screws 107 until the mark upon the flywheel 89 appears to be stationary in the stroboscope at which point the flywheel and the pull down mechanism will be in correct balance.

A pin 113 secured to the flywheel disk 93 projects through an elongated slot 114 in the disk 96. Normally the pin 113 rests in the center of the slot 114 but when starting, the end of the slot engages the pins 113, due to inertia of the flywheel rim 94 to bring the pull down mechanism up to normal speed.

The eccentric disk 18 may be provided with gear teeth around its periphery through which the shutter and other ancillary mechanism may be driven.

Having thus described the invention, what is claimed as new and desired to secure by Letters Patent, is:

1. A film pull down mechanism comprising the combination of a film advancing member, a rocking slide bearing for said member, an eccentric, a drive shaft for said eccentric, a connecting member slidably connected to said bearing and pivotally connected to said eccentric, means for imparting an oscillating motion to said film advancing member under control of said connecting member, a second connecting member pivotally connected to said eccentric, a cam, an operative connection between said second connecting member and said cam, a cam follower for said cam and an operative connection between said cam follower and said film engaging member for imparting a film engaging and disengaging motion to said film advancing member.

2. A film advancing mechanism comprising the combination of a film advancing member, a pivotal slide bearing for said member, a rotating member having an offset portion thereon, a connecting member slidably connected to said bearing and engaged by the offset portion of said rotating member, means for imparting an oscillating motion to said film advancing member under control of said connecting member, a cam, a cam follower, an operative connection between said cam follower and said film advancing member for transmitting a film engaging and disengaging motion to said film advancing member, a second connecting member engaged by the offset portion of said rotating member, and an operative connection between said cam and said second connecting member for oscillating said cam.

3. A film pull down mechanism comprising the combination of a film advancing member, a rocking bearing for said member, said member being slideable in said bearing, an eccentric, a connecting rod pivotally connected to said eccentric and slideably connected to said rocking bearing for imparting an oscillating movement to said film advancing member, a second connecting rod pivotally connected to said eccentric, a cam, an operative connection between said second connecting rod and said cam, a cam follower for said cam, a register pin member operated by said cam follower and a link between said cam follower and said film advancing member for imparting in and out motion to said mechanism.

4. In a motion picture film advancing mechanism the combination, with a film guide, of a film advancing member adapted to engage and advance a film in said guide, an eccentric, means for transmitting motion from said eccentric to said film advancing member for pulling down said member, a cam, a connecting rod connecting said eccentric to said cam for imparting an oscillating motion to said cam, a cam follower for said cam, and a connection between said cam follower and said film advancing member to impart a film engaging and withdrawing motion to said member.

5. A film advancing mechanism for motion picture apparatus comprising the combination of a film guide, a film advancing member adapted to intermittently move a film in said guide, an eccentric, an operative connection between said eccentric and said member for pulling down said member, a cam, an arm connected to said cam, a link connection between said arm and said eccentric, a cam follower connected to said member and adapted to be engaged by said cam for imparting a film engaging and disengaging motion to said member.

6. A film pull down mechanism comprising the combination of a film guide, a film advancing member adapted to intermittently move a film in said guide, a sliding rocking bearing for said member, an eccentric for rocking said member about said bearing, a cam operated by said eccentric, a cam follower adapted to be positively actuated in opposite directions by said cam, and an operative connection between said cam follower and said member for reciprocating said member.

7. A film advancing mechanism comprising the combination of a film advancing member, a film registering member, an eccentric, means for rotating said eccentric, a cam, a link connection between said eccentric and said cam for oscillating said cam, a cam follower for said cam, an operative connection between said follower and said film advancing member for engaging and disengaging said film advancing member with the film, a second cam connected to said link connection, a cam follower for said last mentioned cam and an operative connection between said last mentioned follower and said film registering member.

8. A film advancing mechanism comprising the combination of means providing a film path, a film advancing member therefor, a film registering member, an eccentric, a cam, rotatable driving means, a link connection between said eccentric means and said cam for oscillating said cam, means interconnecting said cam and said film advancing member for moving said film advancing member into and out of said path, means interconnecting said eccentric and said film advancing member for imparting a film advancing stroke to said film advancing member while in engagement with said film, a second cam, means connecting said second cam with said link connection for oscillating said second cam, and means interconnecting said second cam and said film registering member for moving said film registering member into and out of said path.

9. A film advancing mechanism comprising the combination of a film advancing member, a film registering member, a pair of cams, respective cam followers operatively connected to said film advancing member and said film registering member, said respective cam followers engaging respective ones of said cams, an eccentric, means for rotating said eccentric, and a link connection between said eccentric and said cams for oscillating said cams about a fixed point.

10. A film advancing mechanism comprising the combination of a film advancing member, a film registering member, a pair of cams having active and inactive portions thereon, respective cam followers operatively connected to said film advancing member and said film registering member, said respective cam followers engaging respective ones of said cams for imparting a film engaging motion to said members, an eccentric, and a link connection between said eccentric and said cams for oscillating said cams, said inactive portions of said respective cams engaging said respective cam followers when said respective members are in film engaging position.

11. A motion picture film advancing mechanism comprising a film advancing member, an eccentric, a pair of independently movable connecting rods, means for pivotally connecting both of said rods fixedly to said eccentric, cam means between one of said rods and said member for controlling the film engaging and disengaging motion of said member and means for controlling the film advancing motion of said member by the other of said rods.

12. A motion picture film advancing mechanism according to claim 11 wherein both of said rods are pivotally connected to the same point on said eccentric.

13. A film pull down mechanism comprising the combination of a film advancing member, a film registering member, a rocking slide bearing for said film advancing member, an eccentric, a connecting member pivotally connected to said eccentric, means interconnecting said film advancing member and said connecting member for imparting an oscillating motion to said film advancing member under control of said connecting member, a cam, a second connecting member pivotally connected to said eccentric, an operative connection between said second connecting member and said cam, a link, a pivotal support for said link, a cam follower on said link and operatively connected to said cam, an operative connection between said link and said film advancing member for producing a film engaging and disengaging motion to said film advancing member, a second cam operatively connected to said second connecting member, a cam follower for said second cam and an operative connection between said last mentioned cam follower and said film registering member.

ALBERT W. TONDREAU.